United States Patent [19]
Belter et al.

[11] 3,874,675
[45] Apr. 1, 1974

[54] METALLIC GASKET ASSEMBLY

[75] Inventors: Jerome G. Belter, Mount Prospect; Dan C. Battistoni, Chicago, both of Ill.

[73] Assignee: Dana Corporation, Toledo, Ohio

[22] Filed: Aug. 20, 1973

[21] Appl. No.: 390,008

[52] U.S. Cl. ................. 277/11, 277/180, 277/211, 277/235 B, 277/236
[51] Int. Cl. ............................................. F16j 15/00
[58] Field of Search ................. 220/46 MS; 29/522; 285/363; 403/288; 277/207, 9, 11, 180, 192, 195, 199, 203, 211, 218, 235 B, 236

[56] References Cited
UNITED STATES PATENTS

| | | | |
|---|---|---|---|
| 1,523,828 | 1/1925 | Nilson | 277/217 |
| 1,546,622 | 7/1925 | Cook | 277/218 |
| 1,889,828 | 12/1932 | Gehrman | 277/192 |
| 2,462,762 | 2/1949 | Nardin | 277/11 |
| 2,860,540 | 11/1958 | Karlsson | 29/522 |
| 3,077,811 | 2/1963 | Moore | 29/522 |

*Primary Examiner*—Richard E. Aegerter
*Assistant Examiner*—L. Footland
*Attorney, Agent, or Firm*—Robert E. Pollock

[57] ABSTRACT

The invention disclosed is a metallic gasket assembly having a main body which defines an insert opening. A metallic insert of a thinner gauge metal than the main body is positioned within the opening. The insert includes at least one insert portion, such as a tab, which mates with the opening defined by the main body. An embossment on the tab is compressed to deform and expand the tab outwardly into locking engagement with the main body.

11 Claims, 9 Drawing Figures

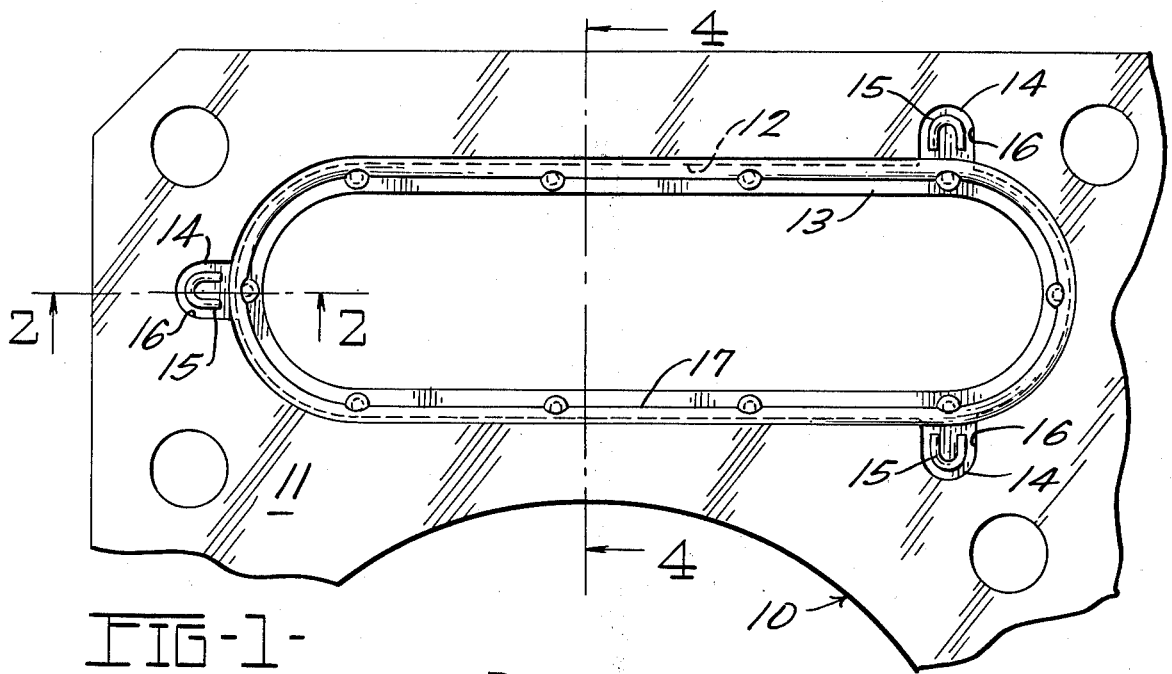
FIG-1-
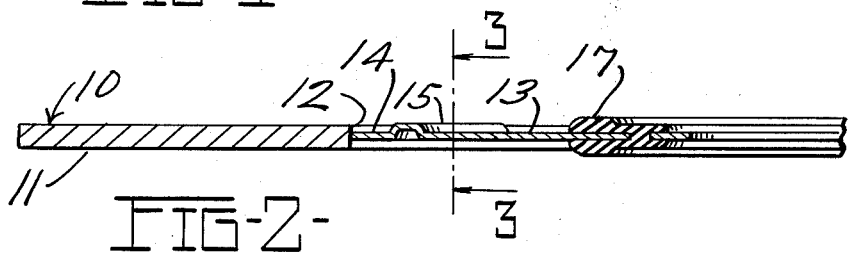
FIG-2-
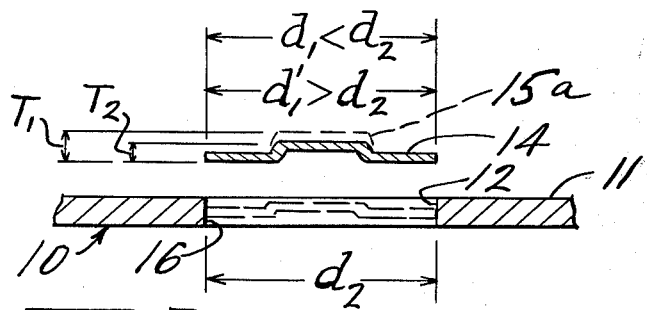
FIG-3-
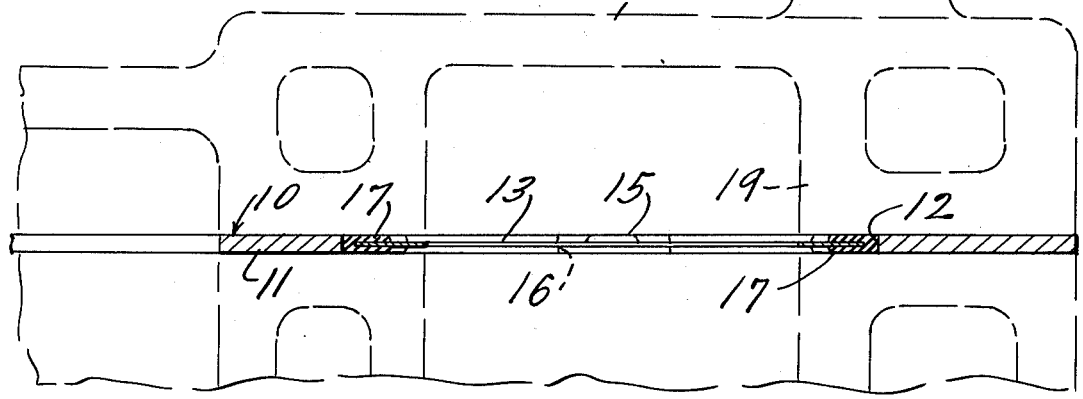
FIG-4-

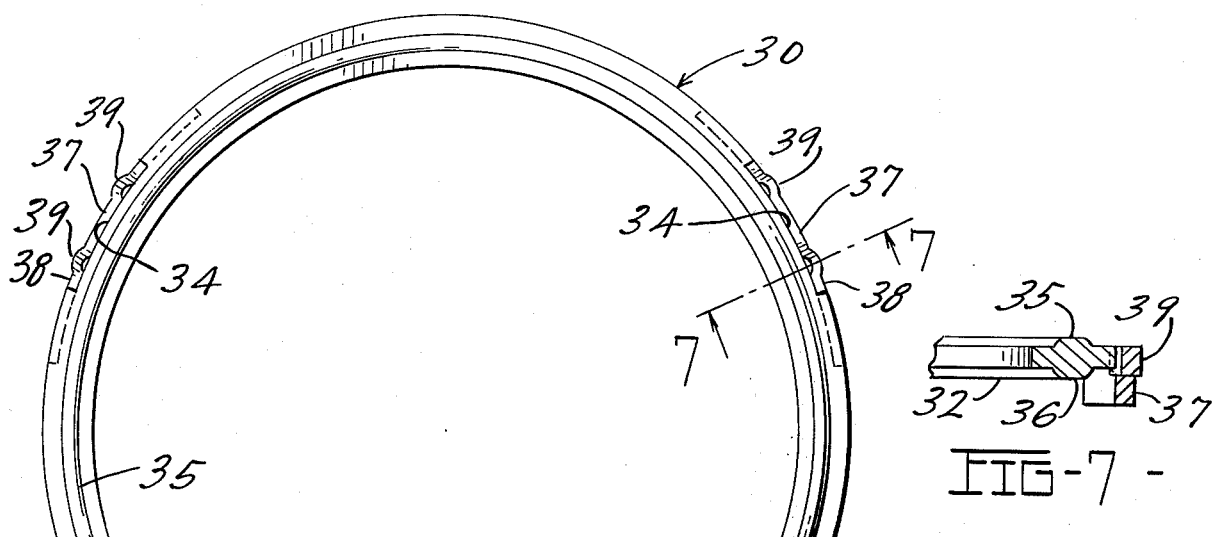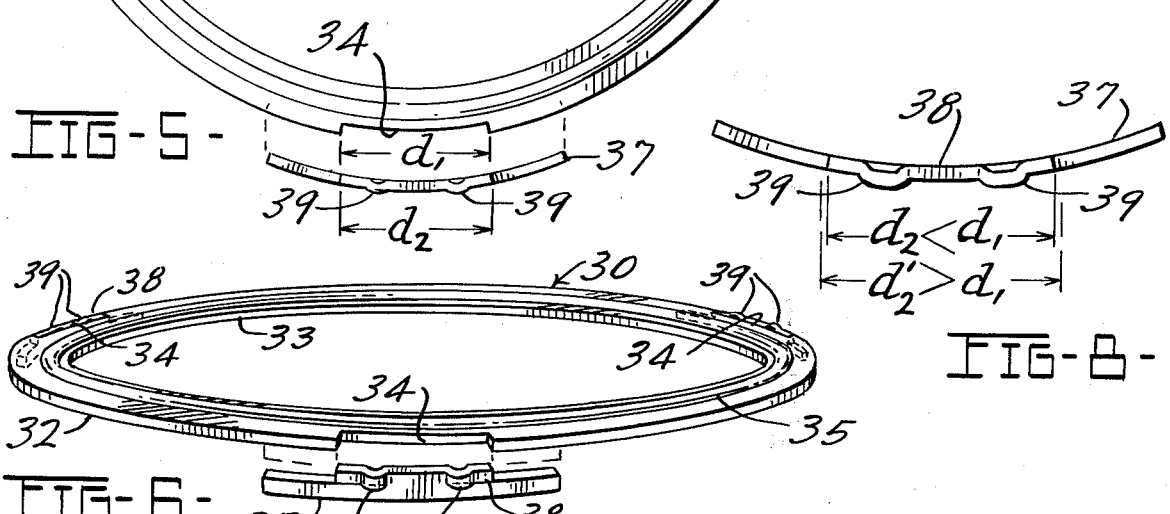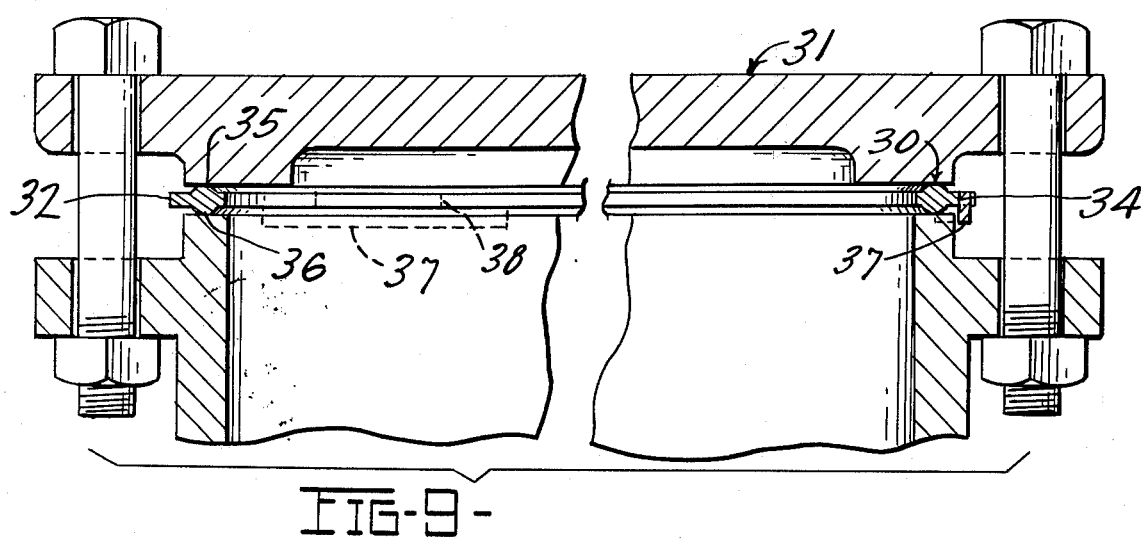

3,874,675

METALLIC GASKET ASSEMBLY

BACKGROUND OF THE INVENTION

Metallic gaskets are well known in the prior art. For example, metallic cylinder head plate gaskets are often used. This type of gasket is normally constructed of a heavy gauge steel. In addition to the cylinder openings in the plate gasket, it is often necessary to provide openings for the passage of fluids. These fluid openings may be, for example, oil pushrod openings or water ports. Providing a metallic plate gasket which effectively seals against fluid pressures has been a problem in the art. One prior art solution to this problem is to take separate rubber sealing members having the same configurations as the fluid openings in the metallic plate gasket and adhere the rubber sealing members in these fluid openings. However, the cementing of the rubber inserts in the fluid openings was often done manually which resulted in excessive time to manufacture the metallic plate gasket and additionally was subject to human frailties.

SUMMARY OF THE INVENTION

The present invention is directed to a metallic gasket assembly which includes a main body which defines, for example, a fluid insert opening. A metallic insert of a thinner gauge metal than the main body is positioned within the opening. In one embodiment, the insert includes a plurality of tabs which exend outwardly from the lighter metal insert and mate with complementary recesses in the periphery of the main body opening. The inserts have embossments defined thereon which are compressed, thereby expanding the tabs against the main body forming a mechanical lock between the insert and the main body of the gasket assembly. In this embodiment, a rubber-like layer of resilient material is mounted on the insert in surrounding relationship to any fluid openings.

In another embodiment, the main body portion of the gasket assembly is ring-shaped and defines an opening in the outer periphery. The insert is utilized as a locating and retaining device for assembling the ring-shaped gasket on the engine. The gasket assembly includes an insert portion which mates with the peripheral opening. Embossment means are provided on the insert portion and are compressed to expand the insert portion against the vertical wall of the peripheral opening, thereby forming a mechanical lock with the ring-shaped main body portion.

BRIEF DESCRIPTION OF THE DRAWINGS

FIG. 1 is a fragmentary plan view of a gasket assembly according to the present invention;

FIG. 2 is a vertical cross-sectional view taken along the line 2—2 of FIG. 1 and shown on an enlarged scale;

FIG. 3 is a diagrammatic cross-sectional view taken generally along the line 3—3 of FIG. 2 showing the mechanical locking arrangement between an insert portion of the metallic insert element and the complementary insert opening provided in the main body of the gasket assembly and also showing in the upper part of FIG. 3 the mechanical locking device of the insert portion of the metallic insert element, not installed in the main body of the gasket assembly;

FIG. 4 is a diagrammatic view showing a metallic gasket assembly, according to the present invention, installed in an engine block which is indicated by dashed lines;

FIG. 5 is a plan view of another embodiment of the present invention showing a ring-shaped metallic gasket assembly;

FIG. 6 is a perspective view of the embodiment shown in FIG. 5 and showing an insert being moved into position with the complementary insert opening in the main gasket body;

FIG. 7 is a fragmentary, vertical section view taken along the line 7—7 of FIG. 5 and shown on an enlarged scale;

FIG. 8 is a diagrammatic view showing the dimensional relationships between the insert portion of the metallic insert and the complementary opening in the main body; and FIG. 9 is a fragmentary, vertical sectional view showing a ring-shaped gasket assembly, as shown in FIG. 5, installed in an engine.

DESCRIPTION OF THE PREFERRED EMBODIMENTS

A metallic gasket assembly, according to the present invention, is generally indicated by the reference number 10 in FIG. 1. The gasket 10 includes a main gasket body 11 having an insert opening 12 defined therein. In the present embodiment, the main gasket body 11 is constructed of steel and has a predetermined thickness of between 0.050 and 0.090 inch. The main gasket body 11 can also be constructed from other suitable materials. A metallic insert 13 having a plurality of insert portions or tabs 14 is positioned within the opening 12. The metallic insert 13 is constructed of steel and has a thickness which is less than the predetermined thickness of the main gasket body 11. In the present embodiment, the thickness of the metallic insert 13 is between 0.015 and 0.030 inch. While the present metallic insert 13 is constructed of steel, in other embodiments brass inserts or stainless steel inserts may be utilized.

Embossments 15 are provided on the insert portions of tabs 14. In the present embodiment, the embossments 15 comprise U-shaped beads, however, various types of embossments may be utilized. The embossments 15 are compressed at the time of assembly thereby deforming and expanding the outer peripheries of the tabs 14. This mechanically locks or secures the metallic insert 13 to the main gasket body 11.

An important feature of the present invention is that when the embossments 15 are compressed, for example, during an assembly operation, all of the deformation occurs in the metallic insert 13 and none in the main gasket body 11.

The insert opening 12 has a plurality of recesses 16 which receive the complementary shaped tabs 14. Referring to FIG. 3, an embossment 15a is indicated in dashed lines. The embossment 15a shows the configuration of the embossment prior to compression. The recess 16 has a width $d_2$, while the tab has a width $d_1$. Prior to compression, the width $d_1$ is slightly smaller than the width $d_2$ of the recess 16. After compression, the tab has a width $d'_1$ which is equal to the width $d_2$ of the recess 16, since the tab is restricted by the recess 16. The tab width $d'_1$ is greater than the width $d_2$ of the recess 16 when compressing the embossment 15a unrestricted as shown in the upper part of FIG. 3. Simultaneously, the height $T_1$ of the embossment 15a is reduced during the compression to a height $T_2$, as shown in FIG. 3. During the compression, the tabs 14 deform and expand their outer peripheries against the recess portion 16 of the main gasket body 11, thereby mechanically locking the metallic insert 13 in the gasket assembly 10.

In the present embodiment, a layer of resilient material 17 is mounted on the metallic insert 13 and extends continuously around the opening 12. The resilient material of the layer 17 is constructed of a silicon rubber composition, however, other types of resilient material such as buna rubber, neoprene or viton rubber compositions may be utilized. In the present embodiment, the layer of resilient material 17 is chemically bonded to the metallic insert 13.

Referring to FIG. 4, a metallic gasket assembly 10 is shown in an operative position within an engine, generally indicated by the dashed lines 18. The engine 18 has a fluid passageway 19 and the metallic gasket assembly 10 provides an effective seal with respect to the fluid passageway 19.

Another embodiment of a metallic gasket assembly is generally indicated in FIG. 5 by the reference number 30. The metallic gasket assembly 30 serves as a combustion sealing ring and is mounted in an engine 31, as shown in FIG. 9. The metallic gasket assembly 30 has a ring-shaped main gasket body 32 defining an inner opening 33 and a plurality of insert openings 34 in its outer periphery. The body 32 has a predetermined thickness, which in the present embodiment is approximately 0.055 inch at its outer edge. Continuous beads 35 and 36 are formed in the central portion of the main gasket body 32. The thickness of the body 32 taken through the beads 35 and 36 is approximately .075 inch. A metallic insert 37 has an upwardly extending insert portion 38 of a configuration which mates with a respective insert opening 34 of the main gasket body 32. A metallic insert 37 is provided for each of the insert openings 34 in the periphery of the ring-shaped main gasket body 32. While the insert 37 has one insert portion 38, other embodiments (not shown) may have two or more insert portions 38 extending from the insert 37. The thickness of the insert portion 38 is approximately 0.020 inch.

In this embodiment, a pair of parallel embossments 39 are provided in the insert portion 38 of the metallic insert 37. Referring to FIGS. 5 and 8, prior to compressing the embossments 39, if an insert opening 34 has a width $d_1$, the corresponding width $d_2$ of the insert portion 38 is slightly smaller than the width $d_1$. During compression of the embossments 39, by an assembly operation or otherwise, the insert portion 38 is expanded circumferentially against the sides of the insert opening 34 of the main gasket body 32, such that the dimension $d'_2$ is equal to the width $d_1$, since it is restricted by the opening 34. The dimension $d'_2$ is greater than the width $d_1$ when compressed unrestricted by the opening 34. This insures that the inserts 37 are mechanically locked to the main gasket body 32 to form the metallic gasket assembly 30, according to the present invention. Again, it is important that the main gasket body not be deformed during the production of the metallic gasket assemblies 30.

The insert portion 38 is complementary with the insert opening 34 of the main gasket body 32 and extends generally perpendicularly to the plane of the ring-shaped main gasket body 32.

Referring to the right-hand side of FIG. 9, in the present embodiment, the metallic inserts 37 serve as locating and retaining means for positioning the gasket assembly within the engine 31. This is particularly important when the engine is assembled in a position such that the gasket assembly 30 is not held in position by gravity during the assembly of the engine components.

It has been found that the metallic gasket assemblies, constructed according to the present invention, are suitable for use in many varying types of applications, two of which have been described above.

What we claim is:

1. A metallic gasket assembly comprising, in combination, a main gasket body having a predetermined thickness, said main gasket body defining an insert opening and a plurality of tab recesses, a metallic insert having an outer periphery complementary with said insert opening positioned within said opening, said metallic insert including a plurality of outwardly extending tabs complementary with and positioned within said tab recesses, said main gasket body encompassing said metallic insert, each of said insert tabs having at least one embossment defined thereon, the outer edge of each of said tabs being positioned tightly against said main gasket body, whereby said metallic insert is secured to said main gasket body.

2. A metallic gasket assembly according to claim 1, said insert portion having a thickness less than said predetermined thickness of said main gasket body.

3. A metallic gasket assembly according to claim 2, wherein said main body is constructed of steel, said predetermined thickness of said main body is between 0.050 and 0.090 inch, and wherein said insert portion is constructed of steel having a thickness between 0.015 and 0.030 inch.

4. A metallic gasket assembly according to claim 1, wherein said embossments comprise a U-shaped bead defined on each of said tabs.

5. A metallic gasket assembly according to claim 4, wherein said insert portion has a thickness less than said predetermined thickness of said main gasket body.

6. A metallic gasket assembly according to claim 1, wherein said metallic insert defines at least one fluid opening therethrough, and a continuous layer of resilient material mounted on said metallic insert and surrounding such fluid opening.

7. A metallic gasket assembly according to claim 6, wherein said resilient material comprises a silicone rubber.

8. A metallic gasket assembly comprising, in combination, a main gasket body having a predetermined thickness, said main gasket body defining an insert opening, a metallic insert positioned within such insert opening, said metallic insert having a thickness less than said predetermined thickness and a shape complementary with said insert opening, said gasket body defining a plurality of tab recesses adjacent such insert opening, said metallic insert including a plurality of outwardly extending tabs positioned within said tab recesses, each of said tabs having embossments thereon, the outer periphery of said tabs positioned against said main gasket body, thereby mechanically locking said metallic insert to said main gasket body.

9. A metallic gasket assembly according to claim 8, wherein said metallic insert defines at least one fluid opening therethrough, and an endless strip of resilient material mounted on said metallic insert in a surrounding relationship with such fluid opening.

10. A metallic gasket assembly according to claim 9, wherein said resilient material comprises a silicone rubber.

11. A metallic gasket assembly according to claim 9, wherein said main body is constructed of steel, said predetermined thickness of said main body is between 0.050 and 0.090 inch, said insert portion is constructed of steel and said insert portion has a thickness between 0.015 and 0.030 inch.

* * * * *

UNITED STATES PATENT OFFICE
CERTIFICATE OF CORRECTION

Patent No. 3,874,675    Dated  April 1, 1975

Inventor(s)   Jerome G. Belter et al.

It is certified that error appears in the above-identified patent and that said Letters Patent are hereby corrected as shown below:

The issue date of the patent is shown to be April 1, 1974 and should be shown as April 1, 1975.

Signed and sealed this 17th day of June 1975.

(SEAL)
Attest:

RUTH C. MASON
Attesting Officer

C. MARSHALL DANN
Commissioner of Patents
and Trademarks